(12) United States Patent
Perronnin et al.

(10) Patent No.: US 8,301,579 B2
(45) Date of Patent: Oct. 30, 2012

(54) FAST ALGORITHM FOR CONVEX OPTIMIZATION WITH APPLICATION TO DENSITY ESTIMATION AND CLUSTERING

(75) Inventors: Florent Perronnin, Domene (FR); Guillaume Bouchard, Crolles (FR)

(73) Assignee: Xerox Corporation, Norwalk, CT (US)

( * ) Notice: Subject to any disclaimer, the term of this patent is extended or adjusted under 35 U.S.C. 154(b) by 1059 days.

(21) Appl. No.: 12/245,939

(22) Filed: Oct. 6, 2008

(65) Prior Publication Data

US 2010/0088073 A1    Apr. 8, 2010

(51) Int. Cl.
*G06F 17/00* (2006.01)
*G06N 7/00* (2006.01)
*G06N 7/08* (2006.01)

(52) U.S. Cl. ......................................................... 706/59
(58) Field of Classification Search ......................... None
See application file for complete search history.

(56) References Cited

U.S. PATENT DOCUMENTS

| 6,327,581 | B1 | 12/2001 | Platt | |
| 2006/0098871 | A1* | 5/2006 | Szummer | 382/173 |

OTHER PUBLICATIONS

'Convex Clustering with exemplars based models': Lashkari, 2007, NIPS.*
'Towards automatic concept transfer': Murry, NPAR, 2011 ACM 978-4503-0907.*
Lashkari et al., "Convex Clustering with Exemplar-Based Models," NIPS, pp. 1-8, (2007) at http://people.csial.mit.edu/polina/papers/LashkariGolland_NIP507.pdf; Aug. 14, 2008.
Platt et al., "Fast Training of Support Vector Machines Using Sequential Minimal Optimization," Advances in Kernel Methods—Support Vector Learning, Schlkopf et al., MIT Press, 1-65, 1998.

* cited by examiner

*Primary Examiner* — Kakali Chaki
*Assistant Examiner* — Peter Coughlan
(74) *Attorney, Agent, or Firm* — Fay Sharpe LLP

(57) ABSTRACT

A method of maximizing a concave log-likelihood function comprises: selecting a pair of parameters from a plurality of adjustable parameters of a concave log-likelihood function; maximizing a value of the concave log-likelihood function respective to an adjustment value to generate an optimal adjustment value, wherein the value of one member of the selected pair of parameters is increased by the adjustment value and the value of the other member of the selected pair of parameters is decreased by the adjustment value; updating values of the plurality of adjustable parameters by increasing the value of the one member of the selected pair of parameters by the optimized adjustment value and decreasing the value of the other member of the selected pair of parameters by the optimized adjustment value; and repeating the selecting, maximizing, and updating for different pairs of parameters to identify optimized values of the plurality of adjustable parameters.

21 Claims, 3 Drawing Sheets

FAST ALGORITHM FOR CONVEX OPTIMIZATION WITH APPLICATION TO DENSITY ESTIMATION AND CLUSTERING

BACKGROUND

The following relates to the information processing, clustering, density estimation, and related arts.

Two common tasks in information processing are clustering of a set of N objects into K clusters, and density estimation.

In clustering, one has a group of objects each characterized by a set of features (for example, suitably represented as a features vector), and it is desired to divide the objects into K different groups, classes, or clusters. In some approaches, the clustering problem is represented as an optimization problem, in which the log-likelihood function of the form:

$$\Theta = \sum_{n=1}^{N} \log\left(\sum_{k=1}^{K} w_k p_{k,n}\right) \quad (1)$$

is maximized with respect to the weight parameters $w_k$, $k=1,\ldots,K$, subject to the limits:

$$w_k \geq 0 \forall k=1,\ldots K \quad (2),$$

and further subject to the normalization condition:

$$\sum_{k=1}^{K} w_k = 1. \quad (3)$$

A log-likelihood function such as that of Equation (1) subject to the constraints of Equations (2) and (3) is known to be a concave function, and hence the whole optimization problem maximizing (1) under the constraints (2) and (3) is a convex optimization problem. Therefore, the solution of the problem is unique, which simplifies maximization by avoiding problems due to the presence of problematic local (that is, non-global) maxima. Moreover, some optimization problems formulated as log-likelihood function maximization can be configured to be sparse, meaning that only a small number of the $w_k$ parameters are non-zero, a condition which promotes computational efficiency.

In a clustering application, the index $n=1,\ldots,N$ indexes N objects in a dataset and the index $k=1,\ldots,K$ indexes K candidate cluster centroids. The candidate cluster centroids may be a subset of the objects to be clustered (K<N), the whole set of objects to be clustered (K=N), a disjoint set of objects, or a mix of the objects to be clustered and of objects belonging to a disjoint set. The parameters $p_{k,n}$ represent the probability that the $n^{th}$ object has been generated by the $k^{th}$ cluster. For example, in one generic formulation $p_{k,n} \propto \exp(-\gamma \|o_n - c_k\|^2)$ may be suitable, where $o_n$ represents the location of the $n^{th}$ object in a vector space (for example, the features vector space), $c_k$ represents the location of the $k^{th}$ candidate cluster centroid in the vector space, $\|\ldots\|$ represents a suitable distance measure in the vector space, and $\gamma$ is a non-negative parameter. In a clustering application, K different candidate clusters $c_k$ are defined and the log-likelihood function $\Theta$ of Equation (1) is maximized respective to the weight parameters $w_k$, $k=1,\ldots,K$. Once the optimal $w_k$, $k=1,\ldots,K$ have been identified, the clusters for which the weight parameters $w_k$ are strictly positive numbers are well identified clusters, whereas if $w_k = 0$, the $k^{th}$ cluster is discarded from the set of candidate clusters. Each object indexed by i, $i=1,\ldots,n$ is assigned (in a probabilistic sense) to one or more of the clusters $k=1,\ldots,K$ using the formula $$a_{k,i} = \frac{w_k p_{k,i}}{\sum_{k'=1}^{K} w_{k'} p_{k',i}}$$

such that the objects are optimally distributed amongst the clusters.

Density estimation is an application closely related to clustering. In density estimation, it is desired to estimate a Probability Density Function (PDF) that is representative of the distribution of a group of objects or data points. In some density estimation approaches, the PDF is represented as a linear combination of K constituent functions. In these approaches, a log-likelihood function such as of the form given in Equation (1) is again used, but here with the interpretation that the parameters $p_{k,n}$ represent the degree to which the $n^{th}$ object or data point lies within the $k^{th}$ PDF component, and the weight parameters $w_k$, $k=1,\ldots,K$ are the relative weights of the K constituent PDF components in the linear combination. By maximizing the log-likelihood function $\Theta$ of Equation (1) respective to the weight parameters $w_k$, $k=1,\ldots,K$, the PDF defined by the linear combination is optimized to best represent the distribution of the N objects or data points.

While clustering and density estimation are two useful applications of the log-likelihood function $\Theta$ of Equation (1), numerous other applications exist. For example, log-likelihood functions find application in information entropy-related problems, maximum likelihood problems, and so forth.

Accordingly, there is substantial technological value in developing computationally efficient methods for maximizing log-likelihood functions. A commonplace approach for maximizing a log-likelihood function is the iterative expectation-maximization (EM) algorithm. However, the speed of convergence of EM for log-likelihood maximization is relatively slow. Convergence speed can be enhanced by setting to zero any $w_k$ falling below a selected threshold (such as below $10^{-3}/N$). See, e.g., Lashkari et al., "Convex clustering exemplar-based models", NIPS (2007) (available at http://people.csail.mit.edu/polina/papers/LashkariGolland_NIPS07.pdf, last accessed Aug. 14, 2008), which is incorporated herein by reference in its entirety. However, the EM convergence is still relatively slow even with this enhancement. Other approaches for log-likelihood function maximization include various least-squares optimization techniques such as gradient-based approaches. However, these techniques typically also suffer from various deficiencies such as slow convergence, computational complexity, or so forth when applied to log-likelihood maximization.

BRIEF DESCRIPTION

In some illustrative embodiments disclosed as illustrative examples herein, a method performed by an electronic processing device is disclosed, the method comprising: selecting a pair of parameters from a plurality of adjustable parameters of a concave log-likelihood function; maximizing a value of the concave log-likelihood function respective to an adjustment value to generate an optimal adjustment value, wherein the value of one member of the selected pair of parameters is increased by the adjustment value and the value of the other member of the selected pair of parameters is decreased by the adjustment value; updating values of the plurality of adjustable parameters by increasing the value of the one member of the selected pair of parameters by the optimized adjustment value and decreasing the value of the other member of the selected pair of parameters by the optimized adjustment value; and repeating the selecting, maximizing, and updating for different pairs of parameters to identify optimized values of the plurality of adjustable parameters.

In some illustrative embodiments disclosed as illustrative examples herein, a storage medium is disclosed that stores instructions executable by an electronic processing device to perform a method comprising: selecting a pair of parameters $w_i, w_j$ from a set of K adjustable parameters of a log-likelihood function having the form $$\Theta = \sum_{n=1}^{N} \log\left(\sum_{k=1}^{K} w_k p_{k,n}\right);$$

maximizing a value of the log-likelihood function incorporating a change $\delta$ to the selected pair of parameters $w_i, w_j$ of the form $$\Theta = \sum_{n=1}^{N} \log\left(\sum_{k=1}^{K} w_k p_{k,n} + \delta(p_{i,n} - p_{j,n})\right)$$

respective to the parameter $-w_i \leq \delta \leq w_j$ to generate an optimal value for the change $\delta$; replacing $(w_i)_{new} \leftarrow (w_i)_{old} + \delta$ and $(w_j)_{new} \leftarrow (w_j)_{old} - \delta$; and repeating the selecting, maximizing, and replacing for different pairs of parameters $w_i, w_j$ of the set of K adjustable parameters to identify optimized parameter values for the set of K adjustable parameters.

In some illustrative embodiments disclosed as illustrative examples herein, a system is disclosed, comprising one or more electronic processors configured to perform a concave log-likelihood function maximization process defined by the following operations: selecting a pair of parameters from a plurality of adjustable parameters of a concave log-likelihood function; maximizing a value of the concave log-likelihood function respective to an adjustment value to generate an optimal adjustment value, wherein the value of one member of the selected pair of parameters is increased by the adjustment value and the value of the other member of the selected pair of parameters is decreased by the adjustment value; updating values of the plurality of adjustable parameters by increasing the value of the one member of the selected pair of parameters by the optimized adjustment value and decreasing the value of the other member of the selected pair of parameters by the optimized adjustment value; and repeating the selecting, maximizing, and updating for different pairs of parameters to identify optimized values of the plurality of adjustable parameters; and further configured to perform a task comprising clustering or generating a probability density function representative of a set of objects or data points, the task being performed by (i) generating a task-representative concave log-likelihood function, (ii) invoking the concave log-likelihood function maximization process respective to the task-representative concave log-likelihood function, and (iii) based on the maximized concave log-likelihood function associating the objects or data points with clusters or generating the probability density function representative of the set of objects or data points.

DETAILED DESCRIPTION

Figure 1:
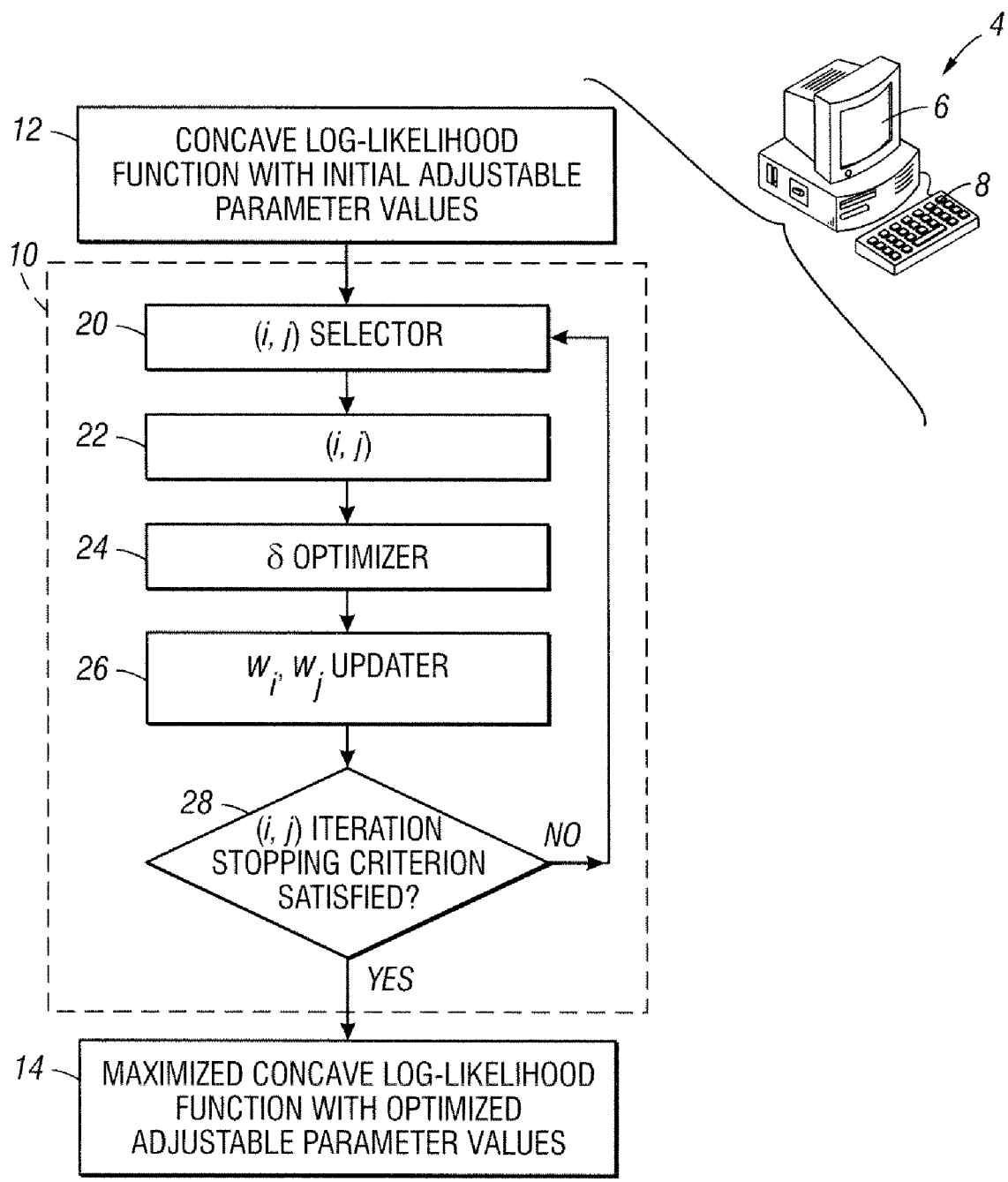
FIG. 1 diagrammatically shows a system for performing log-likelihood function maximization.

As used herein, the term "log-likelihood function" is intended to encompass any function embodying the logarithm of a likelihood of the form given in Equation (1), but is not intended to be limited to a probabilistic interpretation which does not involve likelihood of probabilities. The following relates to any mathematical formulation that has the form of Equation (1) or trivial transformations or variations of it. For example, the log-likelihood function can be the function of Equation (1), such as:

$$\prod_{n=1}^{N}\left(\sum_{k=1}^{K} w_k p_{k,n}\right), \quad (4)$$

Or when the normalization constraints (2) and (3) are removed using a softmax transformation:

$$\Theta = \sum_{n=1}^{N} \log\left(\sum_{k=1}^{K} \frac{e^{w_k}}{\sum_{k'=1}^{K} e^{w_{k'}}} p_{k,n}\right). \quad (5)$$

The index k that indexes the w parameters is optionally multidimensional, for example in the following illustrative log-likelihood function:

$$\Theta = \frac{1}{N}\sum_{n=1}^{N} \log\left(\sum_{u=1}^{U}\sum_{v=1}^{V} w_{u,v} p_{u,v,n}\right). \quad (6)$$

The log-likelihood functions set forth in Equations (1) and (4)-(6) are illustrative examples, and the term "log-likelihood function" as used herein is intended to encompass all these variants set forth herein as well as other variant log-likelihood formulations. The illustrative log-likelihood maximization techniques disclosed herein are disclosed with respect to the illustrative log-likelihood function of Equation (1); however, the skilled artisan can readily adapt these techniques to any of the log-likelihood functions of Equations (4)-(6). Each of the log-likelihood functions of Equations (4)-(6) are of the same form as the log-likelihood function of Equation (1), and differ only insubstantially from Equation (1) in terms of the choice of parameter indexing (or lack thereof), and/or the choice of normalization factor (or lack thereof), and/or so forth.

The log-likelihood functions described herein as illustrative examples are concave log-likelihood functions. A log-likelihood function has adjustable parameters, and is representative of dependence of a likelihood upon those adjustable parameters, and has a single global maximum within a domain of interest of the adjustable parameters. The disclosed techniques for maximizing illustrative log-likelihood functions are expected to be generally applicable to maximizing any concave log-likelihood function respective to its adjustable parameters. The terms "maximization of the log-likelihood function", "log-likelihood maximization", and similar phraseology as used herein is intended to denote maximization of a log-likelihood function such as any of those of Equations (1) or (4)-(6) under the constraints on the w parameters set forth in Equations (2) and (3). Additional constraints or restrictions can be applied during the maximization, such as setting an upper limit on the w parameters, or constraining some w parameters to predetermined fixed values such as may be dictated by a priori information regarding the problem whose solution entails the log-likelihood maximization.

With reference to FIG. 1, an electronic processing device such as an illustrated computer 4 including a display 6 or other output device for displaying or otherwise generating human-perceptible output and a keyboard 8 or other user input device for receiving user input is configured to implement a concave log-likelihood function optimizer 10. The electronic processing device may be the illustrated computer 4, or another electronic processing device such as a network server, Internet-based server, personal data assistant (PDA), cellular telephone, or the like. The log-likelihood function optimization disclosed herein and clustering, density estimation, and other applications employing same may also be embodied as an electronic storage medium storing instructions that are executable by an electronic processing device to perform the disclosed techniques. Such an electronic storage medium may include, for example: a magnetic disk or other magnetic storage medium; an optical disk or other optical storage medium; a random access memory (RAM); a read-only memory (ROM); a FLASH memory; or so forth. More particularly, the concave log-likelihood function maximizer 10 receives a log-likelihood function 12 of the form given in Equation (1), and optimizes the K adjustable parameters $w_k, k=1, \ldots, K$ to generate a maximized log-likelihood function 14 that includes or is defined by a set of optimized values for the K adjustable parameters $w_k, k=1, \ldots, K$.

As used herein, the terms "optimize", "maximize", and similar phraseology is intended to be broadly construed to encompass not only an absolute optimum or an absolute maximum, but also a value that is close to, but not precisely, the global optimum or maximum. For example, an iterative process may be used to optimize the log-likelihood function respective to the parameters $w_k$. In doing so, the iterative algorithm may be terminated based on stopping criteria that causes the algorithm to stop the optimization at a point at which the log-likelihood function is not yet at the absolute global maximum. Such optimization is said to optimize the log-likelihood function respective to the parameters $w_k$, even though the final value of the log-likelihood function may not be the absolute largest value attainable by adjustment of the parameters $w_k$.

The disclosed log-likelihood maximization techniques employ maximization of the log-likelihood function respective to successive selected pairs of the adjustable parameters. The inventors have found that this approach provides substantially improved convergence times as compared with existing computationally intensive techniques such as expectation-maximization (EM), while providing comparable performance in terms of identifying a set of the adjustable parameters that maximizes the log-likelihood function.

The disclosed techniques of maximization of the log-likelihood function respective to successive selected pairs of the adjustable parameters are more generally applicable to maximization of any concave log-likelihood function. That is, any concave log-likelihood function is expected to be maximized in a computationally efficient manner by performing the maximization as respective to successive selected pairs of the adjustable parameters. For convenience, the maximization technique is described with reference to the log-likelihood function of Equation (1), but is expected to be generally applicable for any concave log-likelihood function.

With continuing reference to FIG. 1, a pair selector 20 selects a pair of the adjustable parameters 22. The two adjustable parameters of the pair 22 are indexed by respective integer indices i and j where $1 \leq i \leq K$ and $1 \leq j \leq K$ and $i \neq j$. The selected adjustable parameters 22 are $w_i$ and $w_j$. A pairwise optimization is then performed, that is limited to adjusting the selected adjustable parameters 22, namely adjustable parameters $w_i$ and $w_j$, without making any changes to the remaining adjustable parameters $w_k, k \neq i, j$. Because of the conservation condition of Equation (12), the freedom to adjust $w_i$ and $w_j$ is greatly limited—in fact, the adjustment is restricted to increasing the parameter $w_i$ by an adjustment value denoted herein by $\delta$ (that is, adjusting $w_i$ to a new value $w_i + \delta$) and simultaneously decreasing the parameter $w_j$ by the same adjustment value $\delta$ (that is, adjusting $w_j$ to a new value $w_j - \delta$). Any other adjustment would cause a violation of the conservation condition of Equation (3). It should be noted that the adjustment value $\delta$ may in general be either a positive value or a negative value; as a consequence, there is no loss of generality in employing the additive $w_i + \delta$ and subtractive $w_j - \delta$.

Moreover, the constraint of Equation (2), namely $w_k \geq 0 \forall k=1, \ldots, K$, further limits the possible range of values of the adjustment value $\delta$. The requirement $w_i + \delta \geq 0$ requires $-w_i \leq \delta$. The requirement $w_j - \delta \geq 0$ requires that $\delta \leq w_j$. Combining these two conditions produces the following bounds for the adjustment value $\delta$:

$$-w_i \leq \delta \leq w_j \tag{13}$$

Optionally, further bounds may be imposed on the adjustment value $\delta$, based on further constraints that the problem being solved may impose on the adjustable parameters $w_k$.

With continuing reference to FIG. 1, an optimizer 24 optimizes the adjustment value $\delta$ to maximize the log-likelihood function. Said another way, the optimizer 24 maximizes the log-likelihood function respective to the adjustment value $\delta$. The log-likelihood function of the form of Equation (1) adjusted by the adjustment value $\delta$ can be written as follows:

$$\Theta = \sum_{n=1}^{N} \log\left(\sum_{k=1, k \neq i, j}^{K} w_k p_{k,n} + (w_i + \delta) p_{i,n} + (w_j - \delta) p_{j,n}\right), \tag{7}$$

which can be further rearranged as follows:

$$\Theta(\delta) = \sum_{n=1}^{N} \log\left(\sum_{k=1}^{K} w_k p_{k,n} + \delta(p_{i,n} - p_{j,n})\right). \tag{8}$$

The optimizer 24 suitably maximizes the adjusted log-likelihood function of Equation (15) respective to the adjustment value δ, subject at least to the constraint $-w_i \leq \delta \leq w_j$, and without adjusting any of the adjustable parameters $w_k, k=1, \ldots, K$.

It is believed that there is no closed form solution for the adjustment value δ that maximizes the log-likelihood function of Equation (8). However, the problem is a one-dimensional maximization problem that has both lower and upper bounds imposed by Equation (7). Accordingly, substantially any maximization algorithm can be used, such as a gradient descent method. In some embodiments, an iterative Newton-Raphson algorithm is employed by the optimizer 24 to maximize the log-likelihood function of Equation (8) respective to the adjustment value δ. In this approach, the following iterations are performed (where the index t denotes the iterations, with $\delta_t$ being the current value and $\delta_{t+1}$ being the updated value):

$$\delta_{t+1} \leftarrow \delta_t - \frac{\left(\frac{\partial \Theta}{\partial \delta}(\delta_t)\right)}{\left(\frac{\partial^2 \Theta}{\partial^2 \delta}(\delta_t)\right)}, \quad (9)$$

$$\frac{\partial \Theta}{\partial \delta}(\delta_t) = \sum_{n=1}^{N} \frac{\alpha_{i,n} - \alpha_{j,n}}{1 + \delta_t(\alpha_{i,n} - \alpha_{j,n})} \quad (10)$$

and:

$$\frac{\partial^2 \Theta}{\partial^2 \delta}(\delta_t) = -\sum_{n=1}^{N} \left(\frac{\alpha_{i,n} - \alpha_{j,n}}{1 + \delta_t(\alpha_{i,n} - \alpha_{j,n})}\right)^2, \quad (11)$$

where:

$$\alpha_{i,n} = \frac{p_{i,n}}{\sum_{k=1}^{K} w_k p_{k,n}}, \quad (12)$$

and:

$$\alpha_{j,n} = \frac{p_{j,n}}{\sum_{k=1}^{K} w_k p_{k,n}}. \quad (13)$$

where:
The iterative Newton-Raphson algorithm can suitably be initiated by setting $\delta_{t=0}=0$. Various termination criteria can be employed. In one suitable approach, the iterative Newton-Raphson maximization is terminated when any of three conditions are met: (1) a value of $\delta_{t+1}$ is reached which would violate the bounding condition $-w_i \leq \delta \leq w_j$; (2) the algorithm has converged, for example $|\delta_{t+1} - \delta_t| <$ Theshold where Theshold is a (typically relatively small) positive threshold value; or (3) when the number of iterations reaches a predetermined maximum. For the termination condition (1), various remedial operations can be used to select the final value of δ so as to satisfy the bounding condition $-w_i \leq \delta \leq w_j$. For example, in one approach if $\delta < -w_i$ then the final value is set at $\delta = -w_i$ (which has the effect of zeroing the adjustable parameter $w_i$), while if $\delta > w_j$ then the final value is set at $\delta = w_j$ (which has the effect of zeroing the adjustable parameter $w_j$).

The optimizer 24 outputs the final value for the adjustment value δ. A parameters updater 26 updates the selected parameters $w_i, w_j$ by replacing the current value of $w_i$ by the new value $w_i + \delta$ and replacing the current value of $w_j$ by the new value $w_j - \delta$. A repeating operator 28 causes the selection 20, the δ optimization 24, and the parameter pair updating 26 to repeat until a selected stopping condition is met. One suitable stopping criterion is based on fractional change of the value of the log-likelihood function, for example:

$$\frac{|\Theta_{t+1} - \Theta_t|}{\Theta_t} < \text{Threshold}, \quad (14)$$

where here index t denotes iterations caused by the repeating operation 28. A more complex stopping criterion is based on the recognition that at the precise global maximum of the concave log-likelihood function $$\frac{\partial \Theta}{\partial \delta} = 0$$

for all possible parameter pairs. Referring to Equation (10), it can be seen that this condition is met if and only if:

$$\sum_{n=1}^{N} \alpha_{i,n} = \sum_{n=1}^{N} \alpha_{j,n} \, \forall \, (i, j). \quad (15)$$

Denoting $$\beta_i = \sum_{n=1}^{N} \alpha_{i,n}$$

and $$\beta_j = \sum_{n=1}^{N} \alpha_{j,n},$$

a suitable convergence criterion is $\max_{i,j} |\beta_i - \beta_j| <$ threshold.

Performance of the concave log-likelihood function maximizer 10 is dependent on the algorithm employed by the parameter pairs selector 20 to select successive parameter pairs. In general, it is desired that the selection "cycle through" the K parameters, or at least those of the K parameters having non-zero values, in an efficient manner so that after a few K iterations or less it is ensured that at least all non-zero parameter values have been updated. Moreover, it is desired that each parameter (or at least each non-zero parameter) be occasionally paired with each other parameter (or at least each other non-zero parameter), to ensure that all possible value tradeoffs between the various possible pairs (i,j) are efficiently explored.

In one suitable pairs selection approach, the index i cycles deterministically through all possible values. For example, in successive repetitions caused by the repeater 28, the value of the index i can follow the deterministic sequence $i = 1, 2, 3, \ldots, K, 1, 2, 3, \ldots, K$. For each value of the index i, the index j is selected randomly from all available values $k=1, \ldots, K, k \neq i$. This approach is expected to be sub-optimal in that it does not provide the most efficient pairs selection to reach maximization of the concave log-likelihood function in the fewest number of iterations. However, the selection approach is computationally efficient and has been found to provide good convergence in practice.

In other suitable pair selection approaches, the selection strategy is tailored to enhance the likelihood that a repetition caused by the repeater 28 will produce a relatively large increase in the value of the concave log-likelihood function.

One way to do this is to bias the selection toward selecting a pair of adjustable parameters having large values compared with parameters of the plurality of adjustable parameters that are not selected by the selecting. Typically, larger parameter values contribute more to the value of the concave log-likelihood function than smaller values. One suitable selection approach that provides such weighting is as follows. Performing a first order expansion of the adjusted log-likelihood function of Equation (15) with respect to the adjustment value yields:

$$\Theta(\delta) = \sum_{n=1}^{N} \log\left(\sum_{k=1}^{K} w_k p_{k,n} + \delta(p_{i,n} - p_{j,n})\right) \sum_{n=1}^{N} \log\left(\sum_{k=1}^{K} w_k p_{k,n}\right) + \qquad (16)$$

$$\sum_{n=1}^{N} \log\left(1 + \delta \frac{(p_{i,n} - p_{j,n})}{\sum_{k=1}^{K} w_k p_{k,n}}\right) \sum_{n=1}^{N} \log\left(\sum_{k=1}^{K} w_k p_{k,n}\right) +$$

$$\sum_{n=1}^{N} \log(1 + \delta(\alpha_{i,n} - \alpha_{j,n})),$$

which can be approximated as:

$$\Theta(\delta) \approx \sum_{n=1}^{N} \log\left(\sum_{k=1}^{K} w_k p_{k,n}\right) + \delta \sum_{n=1}^{N} (\alpha_{i,n} - \alpha_{j,n}). \qquad (17)$$

Denote again $$\beta_i = \sum_{n=1}^{N} \alpha_{i,n}$$

and $$\beta_j = \sum_{n=1}^{N} \alpha_{j,n}.$$

If a pair (i,j) has a high value $|\beta_i - \beta_j|$ then it is likely to yield a relatively large increase in the log-likelihood function. Accordingly, at each iteration the selector 20 suitably selects the pair (i,j) that yields the maximum value for $|\beta_i - \beta_j|$. This selection approach is likely to provide convergence with fewer iterations; however, the selection approach is relatively computationally complex.

For some applications, it is expected that the concave log-likelihood function will be relatively sparse, by which it is meant that many, and perhaps most, of the adjustable parameters $w_k$ will be zero. Accordingly, in some embodiments any adjustable parameter whose value becomes zero is no longer treated as adjustable. In other words, in such embodiments once an adjustable parameter goes to zero it is excluded from further selection as a member of the pair of parameters (i,j). Since this can result in erroneous results if the parameter should in fact be non-zero at the global maximum, in some embodiments a parameter having zero value may be kept in the cycling of parameter pair samplings (i,j) for a selected number of iterations or until the concave log-likelihood function appears to be close to convergence, after which time parameters that go to zero are excluded. The phraseology "go to zero" and the like in some embodiments is construed as going below a selected threshold value. In some embodiments, it is contemplated to set a parameter that goes below a selected threshold value identically to zero.

The disclosed concave log-likelihood function maximizer 10 or its substantive equivalents can be used in various applications. Illustrative clustering and density estimation applications are described with reference to FIGS. 2 and 3, respectively.

Figure 2:
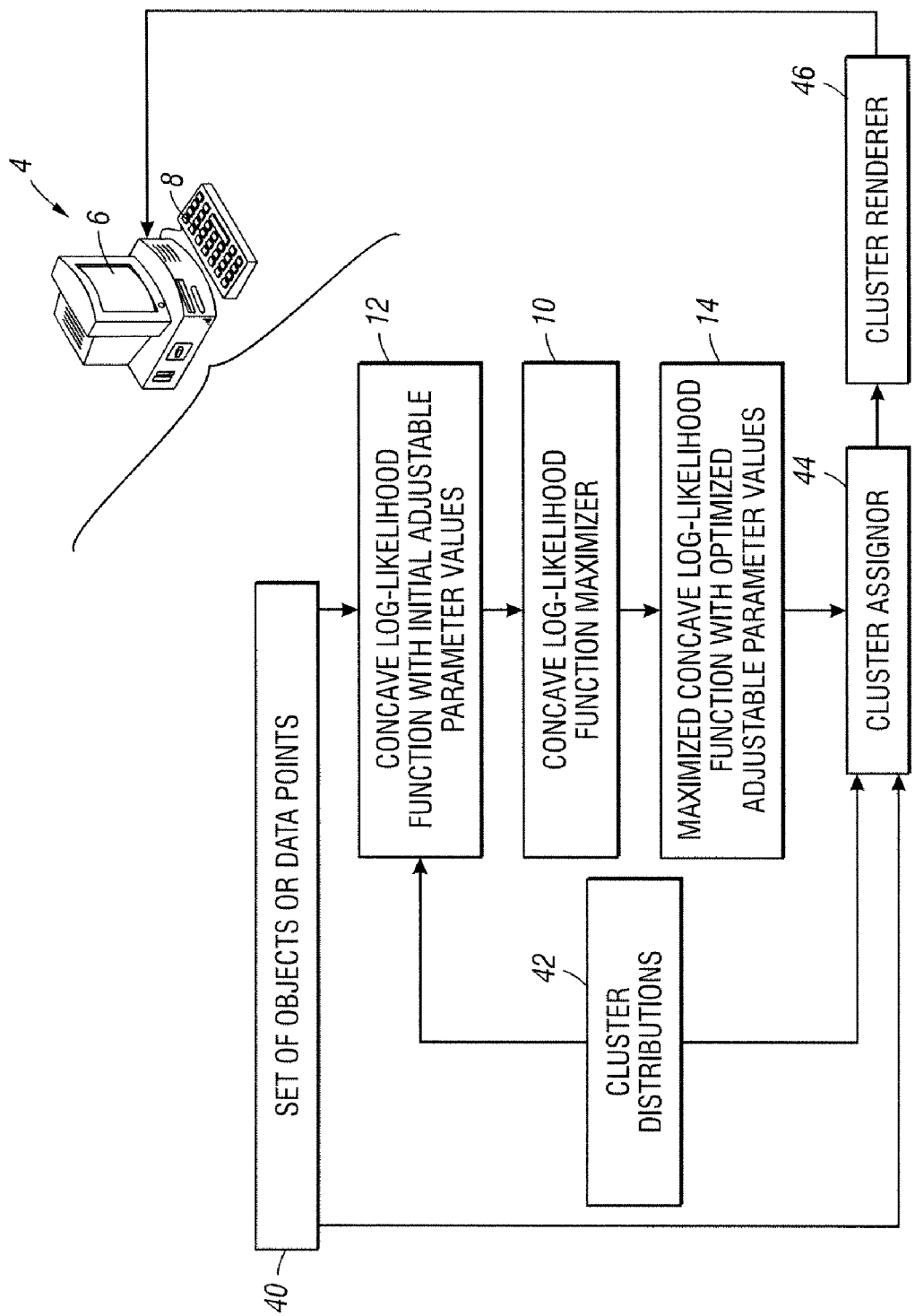
FIG. 2 diagrammatically shows a clustering system employing the log-likelihood function maximization system of FIG. 1.

With reference to FIG. 2, a set of objects or data points 40 are to be clustered into a set of clusters defined by cluster distributions 42. In a mixture model clustering problem, the objects may be members of different clusters with varying probabilities of membership. Such a mixture model clustering problem can be formulated as a log-likelihood maximization problem. See, e.g., Lashkari et al., "Convex clustering examplar-based models", NIPS (2007) (available at http://people.csail.mit.edu/polina/papers/LashkariGolland_NIPS07.pdf, last accessed Aug. 14, 2008), which is incorporated herein by reference in its entirety. The input log-likelihood function 12 is in this application constructed to represent the likelihood that the various objects of the set of objects 40 fall within the various cluster distributions 42. A suitable formulation is set forth in Lashkari as:

$$\Theta(\{q_k\}_{k=1}^{K}, \{m_k\}_{k=1}^{K}, \{x\}_{n=1}^{N}) = \frac{1}{N}\sum_{n=1}^{N} \log\left(\sum_{k=1}^{K} q_k f(x_n; m_k)\right), \qquad (18)$$

where $f(x_n; m_k)$ is an exponential family distribution on a random variable, the set $\{m_k\}_{k=1}^{K}$ represent the centroids of the K clusters, and the set $\{q_k\}_{k=1}^{K}$ represent the K adjustable parameters indicating the mixture weights of the K clusters. The log-likelihood function of Equation (18) serves as the input log-likelihood function 12 that is input to the concave (in this case, log−) likelihood function maximizer 10 to generate the optimized log-likelihood function 14 having or defining the optimized values for the set of mixture weights $\{q_k\}_{k=1}^{K}$. These values are used by a clusters assignor 44 to assign one or more clusters to each object of the set of objects 40 (corresponding to the objects $\{x\}_{n=1}^{N}$ in the formulation of Equation (18). The cluster assignments can be used in various ways. For example, a clusters renderer 46 can plot the objects color-coded by cluster membership or using another type of rendering on the display 6 to enable a human to review the clustering assignments and, optionally, to manually correct any clustering assignments the human user decides are incorrect or non-optimal.

Figure 3:
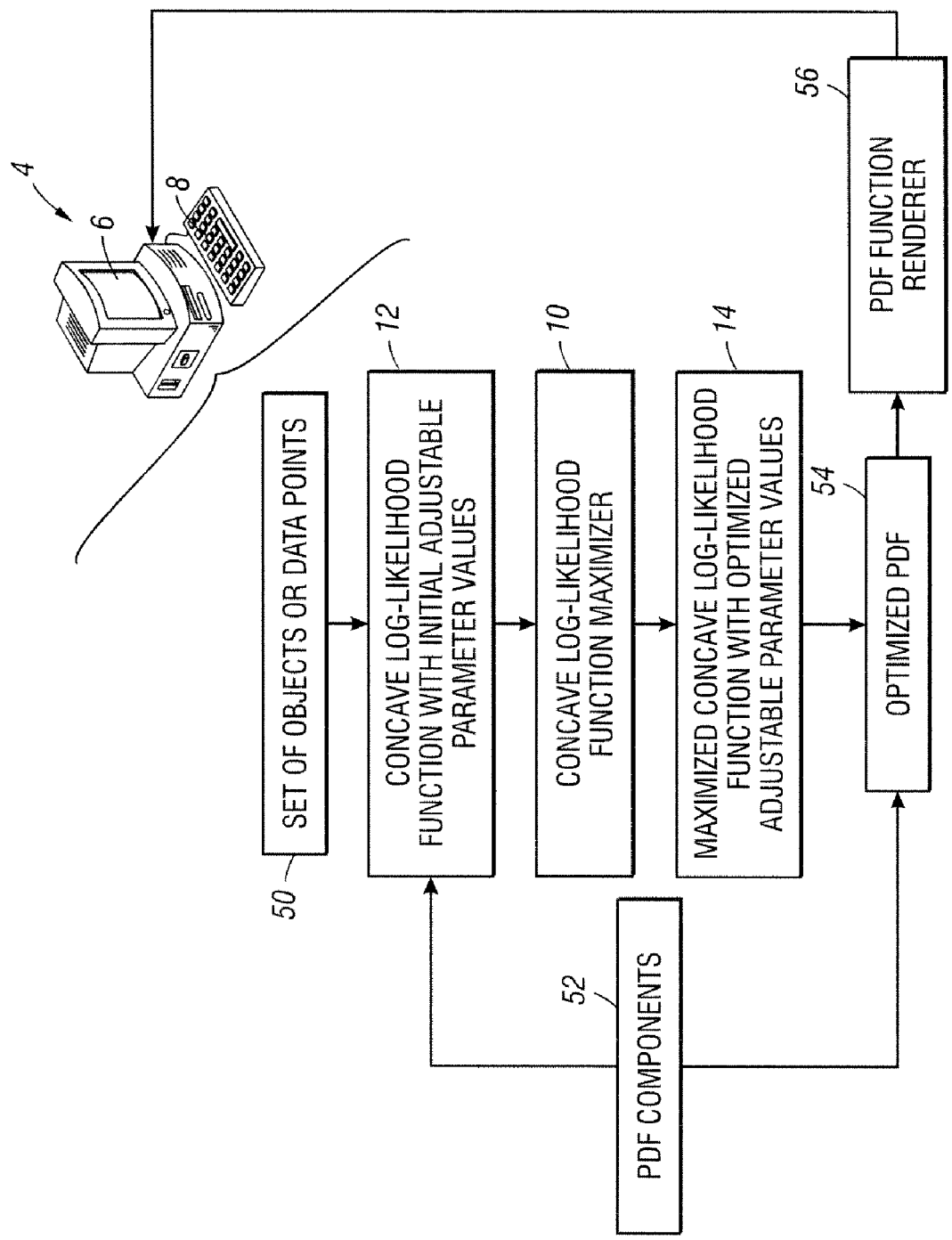
FIG. 3 diagrammatically shows a density function estimation system employing the log-likelihood function maximization system of FIG. 1.

With reference to FIG. 3, a set of objects 50 is to be modeled by a probability density function (PDF). The set of objects 50 are represented as the set $x_n, n=1,\ldots,N$, where $x_n$ denotes the position of the $n^{th}$ object in a space of interests. The PDF is represented by a linear combination of PDF components 52. In an illustrative example, the PDF is a Gaussian Mixture Model (GMM) and the PDF components 52 are K Gaussian components indexed by k, k=1, . . . ,K. Each Gaussian component is centered at a point $x_k$ in the space of interest. For simplicity, each Gaussian component is assumed to have the same known covariance matrix Σ, although this is not required in general. Under these conditions, the likelihood of membership of the $n^{th}$ object in the $k^{th}$ Gaussian component is given by:

$$p_{k,n} = \frac{1}{(2\pi)^{D/2}|\Sigma|^{1/2}} \exp\left[-\frac{1}{2}(x_n - x_k)^T \Sigma^{-1}(x_n - x_k)\right], \quad (19)$$

where D is the dimensionality of the space of interest (that is, the dimensionality of the points $x_n$, the superscript T represents the transpose operator, and the operator | . . . | is the determinant operator. The component $p_{k,n}$ of Equation (19) can be included in the log-likelihood functions set forth here (for example, Equation (1)) to generate the input log-likelihood function 12 that is maximized by the concave (in this case, log–) likelihood function maximizer 10 to generate the optimized log-likelihood function 14 having or defining the optimized values for the set of weights $w_k$ defining the mixture weights for the Gaussian components of Equation (19). An optimized PDF 54 is suitably constructed as a linear combination of the K Gaussian components each given by Equation (19) and each weighted by the corresponding optimized weights $W_k$ determined by the likelihood function maximizer 10. The optimized PDF 54 can be used in various ways. For example, a PDF renderer 56 can plot the objects together with the optimized PDF 54 represented by grayscale shading or using another type of rendering on the display 6 to enable a human to visually review how well the optimized PDF matches the set of objects or data points 50.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
   selecting a pair of parameters $w_i$, $w_j$ from a set of K adjustable parameters of a concave log-likelihood function having the form $$\Theta = \sum_{n=1}^{N} \log\left(\sum_{k=1}^{K} w_k p_{k,n}\right);$$

maximizing a value of the concave log-likelihood function incorporating a change $\delta$ to the selected pair of parameters $W_i$, $w_j$ of the form $$\Theta = \sum_{n=1}^{N} \log\left(\sum_{k=1}^{K} w_k p_{k,n} + \delta(p_{i,n} - p_{j,n})\right)$$

respective to the parameter $-w_i \leq \delta \leq w_j$ to generate an optimal value $\delta_{opt}$ for the change $\delta$;
   updating $(w_i)_{new} \leftarrow (w_i)_{old} + \delta_{opt}$ and $(w_j)_{new} \leftarrow (w_j)_{old} - \delta_{opt}$; and
   repeating the selecting, maximizing, and updating for different pairs of parameters $w_i$, $w_j$ of the set of K adjustable parameters to identify optimized parameter values of the set of K adjustable parameters;
   wherein the selecting, maximizing, updating, and repeating are performed by an electronic processing device.

2. The optimization method as set forth in claim 1, wherein in maximizing employs an iterative Newton-Raphson optimization algorithm.

3. The optimization method as set forth in claim 1, wherein the plurality of adjustable parameters are indexed by k, k= 1, . . . , K, and the selecting and repeating of the selecting comprises:
   (a) selecting one member of the selected pair of parameters $W_i$, $w_j$ using a deterministic formula based on the index k; and
   (b) randomly or non-deterministically selecting the member of the selected pair of parameters $w_i$, $w_j$ not selected by the selection operation (a).

4. The optimization method as set forth in claim 3, wherein each repetition of the selection operation (a) successively selects adjustable parameters in the order of the index k= 1, . . . , K.

5. The optimization method as set forth in claim 1, wherein the selecting and repeating of the selecting is biased toward selecting the pair of parameters $w_i$, $w_j$ from the set of K adjustable parameters having large values compared with parameters of the set of K adjustable parameters that are not selected by the selecting.

6. The method as set forth in claim 1, further comprising:
   storing the optimized parameter values of the set of K adjustable parameters in a memory of or accessible by the electronic processing device.

7. The method as set forth in claim 1, wherein the selecting, maximizing, updating, and repeating, define a log-likelihood function maximization process, the method further comprising:
   performing a clustering process including (i) formulating a clustering log-likelihood function indicative of conformance of a set of objects or data points with a set of candidate cluster centroids, (ii) invoking the log-likelihood function maximization process to maximize the clustering log-likelihood function, and (iii) associating objects of the set of objects with clusters of the set of clusters based on the maximized clustering log-likelihood function;
   wherein the performing of the clustering process is performed by the electronic processing device.

8. The method as set forth in claim 7, further comprising:
   selecting the set of candidate cluster centroids as a subset of the set of objects or data points to be clustered;
   wherein the selecting of the set of candidate cluster centroids is performed by the electronic processing device.

9. The method as set forth in claim 7, further comprising:
   selecting the set of candidate cluster centroids as the set of objects or data points to be clustered;
   wherein the selecting of the set of candidate cluster centroids is performed by the electronic processing device.

10. The method as set forth in claim 7, further comprising:
    selecting the set of candidate cluster centroids as a combination of (i) the objects or data points to be clustered and (ii) a disjoint set of objects or data points;
    wherein the selecting of the set of candidate cluster centroids is performed by the electronic processing device.

11. The method as set forth in claim 7, further comprising:
    storing or outputting in a human-perceptible format information indicative of the association of objects of the set of objects with clusters of the set of clusters based on the maximized clustering log-likelihood function.

12. The method as set forth in claim 1, wherein the selecting, maximizing, updating, and repeating, define a log-likelihood function maximization process, the method further comprising:

performing a density estimation process including (i) formulating a density estimation log-likelihood function indicative of conformance of a parameterized probability density function (PDF) with a set of objects or data points, (ii) invoking the log-likelihood function maximization process to identify parameter values of the PDF that cause the PDF to optimally conform with the set of objects or data points, and (iii) storing or outputting in a human-perceptible format information relating to the PDF optimally conforming with the set of objects or data points;

wherein the performing of the density estimation process is performed by the electronic processing device.

13. The method as set forth in claim 12, wherein the parameterized PDF comprises a Gaussian mixture model (GMM) whose parameter values comprise mixture weights of Gaussian components of the GMM.

14. The method as set forth in claim 1, wherein the concave log-likelihood function having the form $$\Theta = \sum_{n=1}^{N} \log\left(\sum_{k=1}^{K} w_k p_{k,n}\right)$$

is a multidimensional log-likelihood function $$\Theta = \frac{1}{N}\sum_{n=1}^{N} \log\left(\sum_{u=1}^{U} \sum_{v=1}^{V} w_{u,v} p_{u,v,n}\right)$$

having two dimensions.

15. A non-transitory storage medium storing instructions executable by an electronic processing device to perform a method comprising:

selecting a pair of parameters $w_i$, $w_j$ from a set of K adjustable parameters of a log-likelihood function having the form $$\Theta = \sum_{n=1}^{N} \log\left(\sum_{k=1}^{K} w_k p_{k,n}\right);$$

maximizing a value of the log-likelihood function incorporating a change $\delta$ to the selected pair of parameters $w_i$, $w_j$ of the form $$\Theta = \sum_{n=1}^{N} \log\left(\sum_{k=1}^{K} w_k p_{k,n} + \delta(p_{i,n} - p_{j,n})\right)$$

respective to the parameter $-w_i \leq \delta \leq w_j$ to generate an optimal value $\delta_{opt}$ for the change $\delta$;

replacing $(w_i)_{new} \leftarrow (w_i)_{old} + \delta_{opt}$ and $(w_j)_{new} \leftarrow (w_j)_{old} - \delta_{opt}$; and repeating the selecting, maximizing, and replacing for different pairs of parameters $w_i$, $w_j$ of the set of K adjustable parameters to identify optimized parameter values for the set of K adjustable parameters.

16. The non-transitory storage medium as set forth in claim 15, wherein the parameters $p_{k,n}$ represent similarity of an $n^{th}$ object or data point of a set of N objects or data points with a $k^{th}$ centroids candidate of a set of K candidate cluster centroids, the method performed by the executing instructions further comprising:

associating objects or data points of the set of N objects or data points with clusters or groups of the set of K clusters or groups based on the optimized parameter values for the set of K adjustable parameters.

17. The non-transitory storage medium as set forth in claim 15, wherein the parameters $p_{k,n}$ represent conformance of an $n^{th}$ object or data point of a set of N objects or data points with a $k^{th}$ component of a probability density function (PDF) including K PDF components, the method performed by the executing instructions further comprising:

outputting a PDF comprising a linear combination of the K PDF components weighted by the corresponding K optimized parameter values for the set of K adjustable parameters.

18. The non-transitory storage medium as set forth in claim 17, wherein the PDF is a Gaussian Mixture Model (GMM) and the K PDF components are K Gaussian components of the GMM for which the mixture components are fixed and the K adjustable parameters include the component weights.

19. A system comprising:

one or more electronic processors configured to perform a concave log-likelihood function maximization process defined by the following operations:

selecting a pair of parameters $w_i$, $w_j$ from a set of K adjustable parameters of a concave log-likelihood function, maximizing a value of the concave log-likelihood function respective to an adjustment value $\delta$ to generate an optimal adjustment value $\delta_{opt}$, wherein the value of one member $w_i$ of the selected pair of parameters $w_i$, $w_j$ is increased by the adjustment value $\delta$ and the value of the other member $w_j$ of the selected pair of parameters $w_i$, $w_j$ is decreased by the adjustment value $\delta$ and the adjustment value $\delta$ satisfies the condition $-W_i \leq \delta \leq w_j$, updating values of the plurality of adjustable parameters by increasing the value of the one member $w_i$, of the selected pair of parameters $w_i$, $w_j$ the optimized adjustment value $\delta_{opt}$ and decreasing the value of the other member $w_j$ of the selected pair of parameters $w_i$, $w_j$ by the optimized adjustment value $\delta_{opt}$, and repeating the selecting, maximizing, and updating for different pairs of parameters $w_i$, $w_j$ of the set of K adjustable parameters to identify optimized values of the set of K adjustable parameters.

20. The system as set forth in claim 19, further comprising:

an output device configured to output in a human-perceptible format information relating to the association of the objects or data points with clusters or the generated probability density function representative of the set of objects or data points.

21. The system as set forth in claim 19, wherein the one or more electronic processors is further configured to perform a task comprising clustering or generating a probability density function representative of a set of objects or data points, the task being performed by (i) generating a task-representative concave log-likelihood function, (ii) invoking the concave log-likelihood function maximization process respective to the task-representative concave log-likelihood function, and (iii) based on the maximized concave log-likelihood function associating the objects or data points with clusters or generating the probability density function representative of the set of objects or data points.

* * * * *